(12) United States Patent
Chu et al.

(10) Patent No.: US 10,095,206 B2
(45) Date of Patent: Oct. 9, 2018

(54) APPARATUS AND METHOD FOR MODELING AND CONTROL OF CROSS-DIRECTION FIBER ORIENTATION PROCESSES

(71) Applicant: Honeywell International Inc., Morristown, NJ (US)

(72) Inventors: Danlei Chu, North Vancouver (CA); Gregory E. Stewart, North Vancouver (CA); Cristian Gheorghe, Fort Moody (CA); Johan U. Backstrom, North Vancouver (CA)

(73) Assignee: Honeywell Limited, Ontario (CA)

( * ) Notice: Subject to any disclaimer, the term of this patent is extended or adjusted under 35 U.S.C. 154(b) by 604 days.

(21) Appl. No.: 14/497,085

(22) Filed: Sep. 25, 2014

(65) Prior Publication Data

US 2015/0081046 A1   Mar. 19, 2015

Related U.S. Application Data

(62) Division of application No. 13/028,834, filed on Feb. 16, 2011, now Pat. No. 8,862,249.

(51) Int. Cl.
*G05B 17/02* (2006.01)
*D21F 7/06* (2006.01)
*D21G 9/00* (2006.01)

(52) U.S. Cl.
CPC .............. *G05B 17/02* (2013.01); *D21F 7/06* (2013.01); *D21G 9/0027* (2013.01)

(58) Field of Classification Search
CPC .......... G05B 17/02; D21F 7/06; D21G 9/0027
(Continued)

(56) References Cited

U.S. PATENT DOCUMENTS 6,086,237 A   7/2000   Gorinevsky et al.
6,174,413 B1   1/2001   Ruf et al.
(Continued)

OTHER PUBLICATIONS

John Shakespeare, et al., "An On-Line Control System for Simultaneous Optimization of Basis Weight and Orientation Angle Profiles", Proceedings, First EcoPaperTech (Helsinki Finland, Jun. 6-9, 1995), p. 39-50.

(Continued)

*Primary Examiner* — Kenneth M Lo
*Assistant Examiner* — Sivalingam Sivanesan

(57) ABSTRACT

A method includes generating a model associated with cross-directional fiber orientation of a web, which includes identifying spatial frequency characteristics of a fiber orientation (FO) process. The method also includes providing the model for control of the FO process. Generating the model could include performing a spatial impulse test of the FO process, and long wavelength responses of the FO process can be identified by performing a spatial long wavelength test of the FO process or by retrieving information from a historical database. Actuator edge padding can be applied to the model in order to generate a controller model. A controller can be used to control the process based on the controller model. At least one parameter of the controller model can be dynamically adjusted during operation of the controller. The controller can change average fiber orientation angle profiles and twist profiles by only adjusting slice lip actuators in a headbox.

20 Claims, 7 Drawing Sheets

(58) Field of Classification Search
USPC .......................................................... 700/30
See application file for complete search history.

(56) References Cited

U.S. PATENT DOCUMENTS

| | | | |
|---|---|---|---|
| 6,524,441 B2 | 2/2003 | Ruf et al. | |
| 6,564,117 B1 | 5/2003 | Chen et al. | |
| 6,799,083 B2 | 9/2004 | Chen et al. | |
| 7,650,195 B2 | 1/2010 | Fan et al. | |
| 7,820,012 B2 | 10/2010 | Stewart | |
| 8,209,048 B2 | 6/2012 | Zehnpfund et al. | |
| 8,214,071 B2 | 7/2012 | Sasaki et al. | |
| 2007/0039705 A1* | 2/2007 | Stewart ................ | D21G 9/0045 162/198 |
| 2007/0100476 A1* | 5/2007 | Fan ...................... | G05B 13/042 700/31 |
| 2008/0039968 A1 | 2/2008 | Backstrom et al. | |
| 2010/0174512 A1 | 7/2010 | Berggren et al. | |
| 2010/0276099 A1* | 11/2010 | Sasaki ................. | D21G 9/0027 162/252 |

OTHER PUBLICATIONS

John Shakespeare, "Tutorial: Fibre Orientation Angle Profiles-Process Principles and Cross-Machine Control", TAPPI 1998 Process Control, Electrical & Information (Mar. 16-19, 1998, Vancouver BC), p. 593-636.

Ravi Subbarayan, et al., "Control of Fiber Orientation of a Paper Sheet Using On-Line Measurements", Proceedings of 2002 Control System, p. 313-317, 2002.

Shih-Chin Chen, et al., "Closed-loop Control of Fiber Orientation", PaperCon 2008, May 6, 2008, 19 pages.

T. Sasaki, et al., "On-line Fiber Orientation Measurement and Control", Pulp & Paper Canada, Mar./Apr. 2010, p. 35-39.

Dimitry Gorinevsky, et al., "Identification Tool for Cross-Directional Processes", IEEE Transaction on Control Systems Technology, vol. 11, No. 5, 2003, p. 629-640.

Shih-Chin Chen, et al., "Closed-Loop Control of Fiber Orientation on Sheet-Making Processes", TAPPI/PIMA PaperCon'08 Conference, May 4-7, 2008, Dallas, TX, p. 1-9.

Johan Backstrom, et al., "Advanced Multivariable CD Control Delivers Improved Quality, Runnability and Profitability for Different CD Processes", Proceedings of 2004 Control Systems, 2004, 5 pages.

Junqiang Fan, et al., "Approximate Steady-State Performance Prediction of Large-Scale Constrained Model Predictive Control Systems", IEEE Transactions on Control Systems Technology, vol. 13, No. 6, Nov. 2005, p. 884-895.

Johan U. Backstrom, et al., "Constrained Model Predictive Control for Cross Directional Multi-Array Processes", Pulp & Paper Canada, May 2001, 7 pages.

J. Shakespeare, et al., "Online Measurement of Surface Fiber Orientation", Papermaking Research Symposium 2009, Kuopio, Finland, Jun. 1-4, 2009, 10 pages.

Junji Yamamoto, et al., "New Automatic Control System for Fiber Orientation and Improvement of the Quality of Copy Paper", TAPPI/PIMA PaperCon'08 Conference, May 4-7, 2008, Dallas, TX, p. 1-13.

* cited by examiner

APPARATUS AND METHOD FOR MODELING AND CONTROL OF CROSS-DIRECTION FIBER ORIENTATION PROCESSES

CROSS-REFERENCE TO RELATED APPLICATIONS AND PRIORITY CLAIM

This application is a continuation of prior U.S. patent application Ser. No. 13/028,834 filed on Feb. 16, 2011 (now U.S. Pat. No. 8,862,249), which claims priority under 35 U.S.C. § 119(e) to U.S. Provisional Patent Application No. 61/349,049 filed on May 27, 2010, which is hereby incorporated by reference.

TECHNICAL FIELD

This disclosure relates generally to web manufacturing. More specifically, this disclosure relates to an apparatus and method for modeling and control of cross-direction fiber orientation processes.

BACKGROUND

Webs of material are often used in a variety of industries and in a variety of ways. These materials can include paper, multi-layer paperboard, and other products manufactured or processed in sheets or other webs. As a particular example, long sheets of paper or other materials can be manufactured and collected in reels.

Fiber orientation (FO) refers to the dominant alignment direction of fibers in a paper sheet or other web. Fiber orientation can be expressed by a fiber orientation angle and a fiber orientation index. These two properties can be measured by performing a "cut and dry" test, which is illustrated in FIG. 1. A circular sample 102 of a web is desiccated in a laboratory, and the original circular sample 102 typically shrinks into a desiccated sample 104 having an elliptical shape. The angle (α) between the machine direction and the major axis of the ellipsoid is used as the fiber orientation angle. The ratio of the major and minor axes (l/s) is used as the fiber orientation index. "Machine direction" or "MD" refers to a direction in which the web moves (along its length). In contrast, "cross direction" or "CD" refers to a direction across the web (along its width).

Several quality properties are highly related to fiber orientation, such as web strength and dimensional stability. A poor fiber orientation property can cause quality issues for paper products, such as paper jams in sheet-fed devices, mis-register in color printing, twist in multi-layer boards, weakening of corrugated containerboard, and poor runability of high-speed newsprint.

SUMMARY

This disclosure provides an apparatus and method for modeling and control of cross-direction fiber orientation processes.

In a first embodiment, a method includes generating a model associated with cross-directional fiber orientation of a web, where generating the model includes identifying spatial frequency characteristics of a fiber orientation (FO) process. The method also includes providing the model for control of the FO process.

In particular embodiments, the method also includes applying actuator edge padding to the model in order to generate a controller model.

In a second embodiment, an apparatus includes at least one processing unit configured to generate a model associated with cross-directional fiber orientation of a web. The at least one processing unit is configured to generate the model by identifying both low and high spatial frequency characteristics of a fiber orientation (FO) process. The apparatus also includes at least one memory unit configured to store the model.

In a third embodiment, a method includes generating a controller model for a controller that is to control a fiber orientation (FO) process. The controller model is associated with cross-directional fiber orientation of a web. The method also includes dynamically adjusting at least one model parameter of the controller model during operation of the controller.

Other technical features may be readily apparent to one skilled in the art from the following figures, descriptions, and claims.

BRIEF DESCRIPTION OF DRAWINGS

For a more complete understanding of this disclosure and its features, reference is now made to the following description, taken in conjunction with the accompanying drawings, in which.

DETAILED DESCRIPTION

FIGS. 2A through 11, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

Figure 2A:
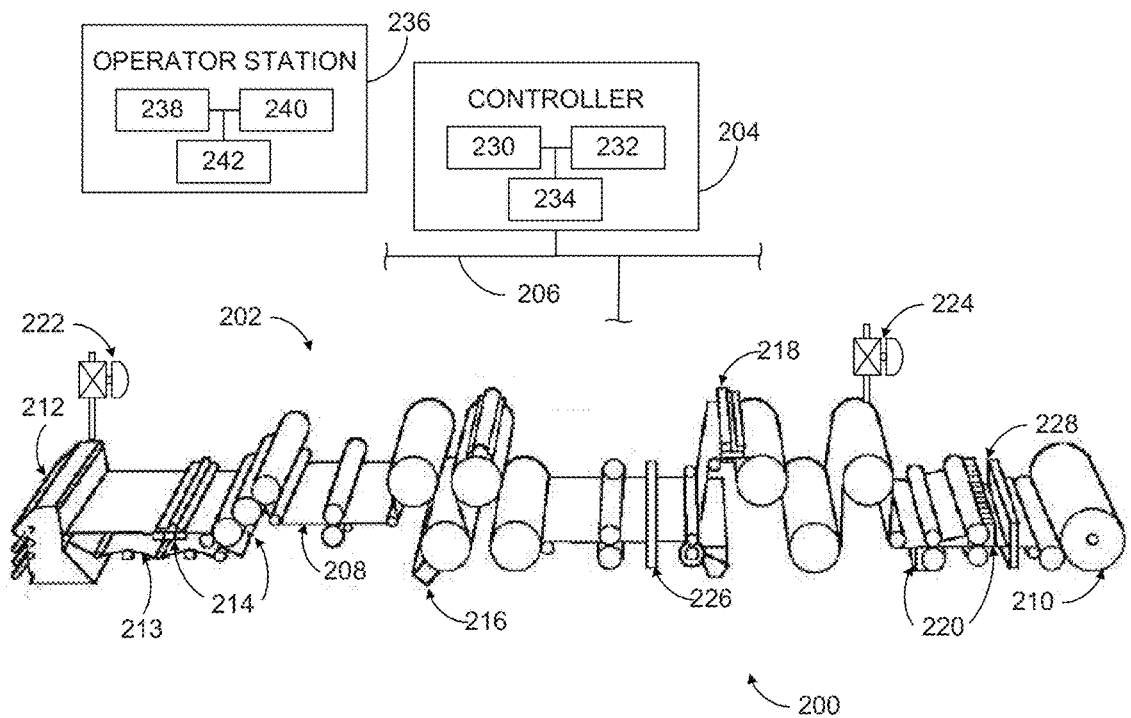
FIGS. 2A and 2B illustrate an example web production system according to this disclosure.
Figure 2B:
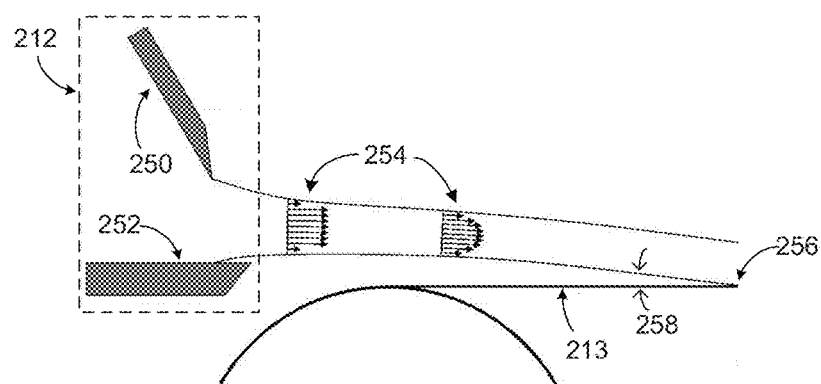

FIGS. 2A and 2B illustrate an example web production system 200 according to this disclosure. As shown in FIG. 2A, the system 200 in this example includes a paper machine 202, a controller 204, and a network 206. The paper machine 202 includes various components used to produce a web, which in this embodiment represents a paper sheet 208 collected at a reel 210. The controller 204 monitors and controls the operation of the paper machine 202, which may help to maintain or increase the quality of the paper sheet 208 produced by the paper machine 202.

In this example, the paper machine 202 includes at least one headbox 212, which distributes a pulp suspension uniformly across the machine onto a continuous moving wire screen or mesh 213. The pulp suspension entering the headbox 212 may contain, for example, 0.2-3% wood fibers, fillers, and/or other materials, with the remainder of the suspension being water. The headbox 212 may include an array of dilution actuators, which distribute dilution water into the pulp suspension across the sheet. The dilution water may be used to help ensure that the resulting paper sheet 208 has a more uniform basis weight across the sheet 208.

FIG. 2B illustrates a more detailed view of part of an example headbox 212. In this example, the headbox 212 includes an array of slice lip actuators 250, which control a slice opening across the machine from which the pulp suspension exits the headbox 212 onto the moving wire screen or mesh 213. The array of slice lip actuators 250 may also be used to control the basis weight of the paper sheet or the distribution of fiber orientation angles of the fibers across the sheet.

The headbox 212 may additionally be equipped with a moveable slice apron 252 (sometimes called a lower lip). Changing the amount of projection of the slice apron 252 in front of the plane of the slice lip actuators 250 changes the angle of the jet 254 leaving the slice. This therefore affects the point of impingement 256 and the angle of impingement 258 of the jet 254 in the forming zone of the moving wire screen or mesh 213. This can influence numerous characteristics of the formed sheet 208.

The speed with which the jet 254 is discharged from the headbox 212 is controlled by regulating the hydraulic pressure of the pulp suspension within the headbox 212 or the pneumatic pressure of an air pad in contact with the pulp suspension inside the headbox 212. The jet speed is commonly controlled to be a specified nominal ratio of the speed of the moving wire or mesh 213 or to have a specified nominal difference in speed with respect to the wire or mesh 213.

Returning to FIG. 2A, various additional components in the paper machine 202 are used to form, press, dry, and calender the paper sheet 208. For example, arrays of drainage elements 214, such as vacuum boxes, remove as much water as possible. An array of steam actuators 216 produces hot steam that penetrates the paper sheet 208 and releases the latent heat of the steam into the paper sheet 208, thereby increasing the temperature of the paper sheet 208 in sections across the sheet. The increase in temperature lowers the viscosity of the wet paper, which allows for easier removal of remaining water from the paper sheet 208. An array of rewet shower actuators 218 adds small droplets of water (which may be air atomized) onto the surface of the paper sheet 208. The array of rewet shower actuators 218 may be used to control the moisture profile of the paper sheet 208, reduce or prevent over-drying of the paper sheet 208, or correct any dry streaks in the paper sheet 208.

The paper sheet 208 is then often passed through a calendar having several nips of counter-rotating rolls. Arrays of induction heating actuators 220 heat the shell surfaces of various ones of these rolls. As each roll surface locally heats up, the roll diameter is locally expanded and hence increases nip pressure, which in turn locally compresses the paper sheet 208. The arrays of induction heating actuators 220 may therefore be used to control the caliper (thickness) profile of the paper sheet 208. The nips of a calendar may also be equipped with other actuator arrays, such as arrays of steam showers, which may be used to control the gloss profile or smoothness profile of the paper sheet in the machine direction.

Two additional actuators 222-224 are shown in FIG. 2A. A thick stock flow actuator 222 controls the consistency of the incoming stock received at the headbox 212. A steam flow actuator 224 controls the amount of heat transferred to the paper sheet 208 from drying cylinders. The actuators 222-224 could, for example, represent valves controlling the flow of stock and steam, respectively. These actuators 222-224 may be used for controlling the dry weight and moisture of the paper sheet 208 in the machine direction.

Additional components could be used to further process the paper sheet 208, such as one or more coating stations (each applying a layer of coatant to a surface of the paper to improve the smoothness and printability of the paper sheet). Similarly, additional flow actuators may be used to control the proportions of different types of pulp and filler material in the thick stock and to control the amounts of various additives (such as retention aid or dyes) that are mixed into the stock.

This represents a brief description of one type of paper machine 202 that may be used to produce a paper product. Additional details regarding this type of paper machine 202 are well-known in the art and are not needed for an understanding of this disclosure. Also, this represents one specific type of paper machine 202 that may be used in the system 200. Other machines or devices could be used that include any other or additional components for producing a paper product or other web. In addition, this disclosure is not limited to use with systems for producing a paper sheet and could be used with systems that produce other items or materials, such as multi-layer paperboard, cardboard or corrugated containerboard, or other materials that are manufactured or processed as moving sheets or other webs.

In order to control the web-making process, one or more properties of the paper sheet 208 may be continuously or repeatedly measured. The sheet properties can be measured at one or various stages in the manufacturing process. This information may then be used to adjust the paper machine 202, such as by adjusting various actuators within the paper machine 202. This may help to compensate for any variations of the sheet properties from desired targets, which may help to ensure the quality of the sheet 208.

As shown in FIG. 2A, the paper machine 202 includes one or more scanners 226-228, each of which may include one or more sensors. Each scanner 226-228 is capable of scanning the paper sheet 208 and measuring one or more characteristics of the paper sheet 208. For example, each scanner 226-228 could include sensors for measuring the fiber orientation, basis weight, moisture, thickness, anisotropy, color, gloss, sheen, haze, surface features (such as roughness, topography, or orientation distributions of surface features), or any other or additional characteristics of the paper sheet 208.

Each scanner 226-228 includes any suitable structure or structures for measuring or detecting one or more characteristics of the paper sheet 208, such as sets or arrays of sensors. A scanning or moving set of sensors represents one particular embodiment for measuring sheet properties. Other embodiments could be used, such as those using stationary sets or arrays of sensors, deployed in one or a few locations across the sheet or deployed in a plurality of locations across the whole width of the sheet such that substantially the entire sheet width is measured.

The controller 204 receives measurement data from the scanners 226-228 and uses the data to control the paper machine 202. For example, the controller 204 may use fiber orientation measurement data to control the headbox slice lip actuators 250 using a model as described in greater detail below. The controller 204 includes any hardware, software, firmware, or combination thereof for controlling the operation of at least part of the paper machine 202. In this example, the controller 204 includes at least one processing unit 230, such as a microprocessor, microcontroller, digital signal processor, field programmable gate array, or application-specific integrated circuit. The controller 204 also includes at least one memory unit 232 storing instructions and data used, generated, or collected by the processing unit(s) 230 and at least one network interface 234 for communicating over the network 206.

The network 206 is coupled to the controller 204 and various components of the paper machine 202 (such as the actuators and scanners). The network 206 facilitates communication between components of system 200. The network 206 represents any suitable network or combination of networks facilitating communication between components in the system 200. The network 206 could, for example, represent a wired or wireless Ethernet network, an electrical signal network (such as a HART or FOUNDATION FIELDBUS network), a pneumatic control signal network, an optical network, or any other or additional network(s).

As described below, the controller 204 can operate to control the fiber orientation of the sheet 208 using one or more models. These models can be generated in any suitable manner. For example, the models can be generated using an operator station 236 that receives input from one or more users, and the operator station 236 can provide the models to the controller 204. The operator station 236 includes any suitable structure for generating a model used to control the paper machine 202. In this example, the operator station 236 includes at least one processing unit 238, at least one memory unit 240, and at least one network interface 242. The processing unit 238 includes any suitable computing or other processing device(s), such as a microprocessor, microcontroller, digital signal processor, field programmable gate array, or application specified integrated circuit. The memory unit 240 includes any suitable volatile and/or non-volatile storage and retrieval device(s). The network interface 242 includes any suitable structure for communicating over one or more networks, such as an Ethernet interface or other electrical signal line interface, an optical interface, or a wireless interface.

Although FIGS. 2A and 2B illustrate one example of a web production system 200, various changes may be made to FIGS. 2A and 2B. For example, other systems could be used to produce paper sheets or other web products. Also, while shown as including a single paper machine 202 with various components and a single controller 204 and a single operator station 236, the production system 200 could include any number of paper machines or other production machinery having any suitable structure, and the system 200 could include any number of controllers or operator stations. In addition, FIGS. 2A and 2B illustrate one operational environment in which fiber orientation of a web can be controlled. This functionality could be used in any other suitable system.

FIGS. 3 through 11 illustrate example details of techniques for modeling and controlling cross-direction fiber orientation processes according to this disclosure. As noted above, a poor fiber orientation property of the sheet 208 can cause various quality issues. Due to these potential issues, an online cross-directional fiber orientation (CD-FO) controller can be used in paper mills and other settings, such as in the controller 204 of FIG. 2A.

In accordance with this disclosure, a model can be created and used to design a closed-loop controller for CD-FO optimization. This controller can then be used to more accurately control the cross-directional fiber orientation in a web. In particular embodiments, the fiber orientation angle of the sheet 208 can be measured by one or more camera-based fiber orientation sensors, such as the FOTOFIBER sensor from HONEYWELL INTERNATIONAL INC. At least one fiber orientation sensor can be mounted on a scanner 226 or 228 and traverse the paper sheet 208 back and forth continuously. At least one fiber orientation sensor could also or alternatively be mounted in a fixed position with respect to the paper sheet 208. Measurements from the fiber orientation sensor(s) can be provided to the controller 204, which uses the measurements to adjust the headbox slice lip actuators 250. This can be done in order to more closely obtain a desired fiber orientation in the sheet 208.

A papermaking process is typically modeled as a two-dimensional distributed system, which contains a spatial model (CD model) component and a dynamic model (MD model) component. The spatial model can define static properties of the papermaking process, such as alignments and spatial response shapes. The dynamic model can specify dynamic properties of the process, such as time constants and time delays. A CD-FO process can be represented by a distributed spatial model cascaded by a dynamic model, but this process has unique spatial (CD) frequency characteristics. Also, in practice, the spatial model of a CD-FO process is highly affected by changes to various parameters, such as the jet/wire ratio, wire speed, headbox pressure, and slice openings. In some embodiments, a parametric spatial model can be used to capture this uniqueness, and a two-stage model identification approach can be employed to optimize the model parameters. Nonlinearity can also be handled, and a gain retune strategy can be used to cover a wide range of CD-FO operating points.

Once the model is defined, the model can be used by the controller 204. In some embodiments, the controller 204 uses a model predictive control (MPC) scheme for fiber orientation regulation. The headbox slice lip actuators 250 can be employed to maintain tight fiber orientation specifications and minimize twist of multi-layer products. Dry weight disturbances induced by slice adjustments for fiber orientation control can be reduced or removed using a CD dilution process (the dilution actuators in the headbox 212). To capture severe edge effects of a CD-FO process, actuator edge padding can be used. In particular embodiments, the controller 204 can change the average fiber orientation angle profiles and the twist profiles by only adjusting the slice lip actuators 250.

CD-FO Model Identification

Typically, a CD process can be modeled as a damped cosine function, which has the parameters of process gain, response width, attenuation, and divergence. Various tests can be conducted on a paper machine in order to identify the model of the CD process. These tests can include traditional "bump" tests (spatial impulse tests) and advanced spatial sinusoidal or long wavelength tests (where actuator setpoint profiles are shaped as a sinusoidal or linear slope function).

Figure 1:
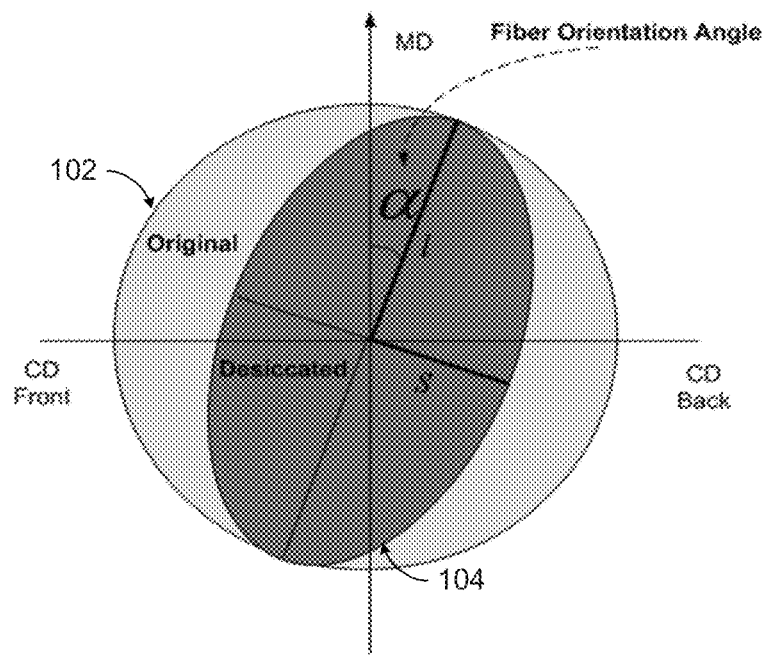
FIG. 1 illustrates a conventional technique for measuring fiber orientation.
Figure 3:
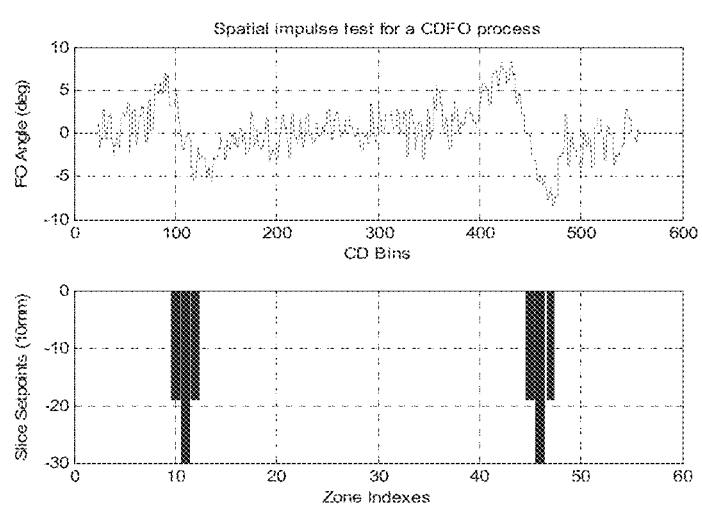
FIGS. 3 through 11 illustrate example details of techniques for modeling and controlling cross-direction fiber orientation processes according to this disclosure.

FIG. 3 illustrates example test results of a traditional bump test on slice lip actuators 250. Anti-symmetric fiber orientation responses are observed in FIG. 3. One drawback of traditional "bump" tests is that a spatial impulse signal distributes excitation energy equally across a full spatial frequency band. If the static process gain at a certain frequency band is small where the dominant process disturbance is located, a traditional bump test may not be capable of exciting the process sufficiently to generate useful information for process identification.

Figure 4:
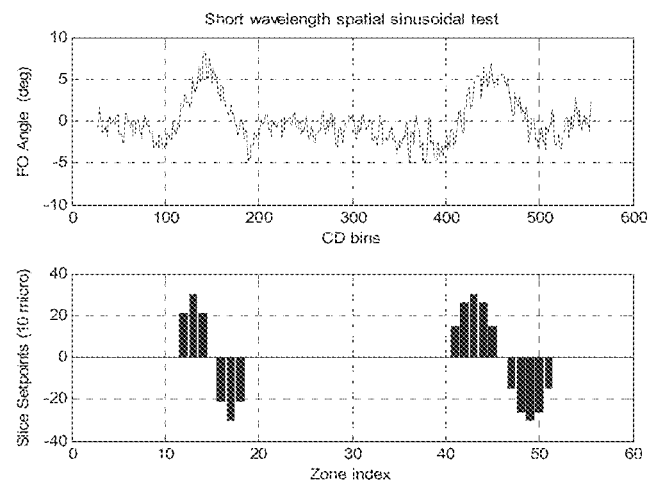
Figure 5:
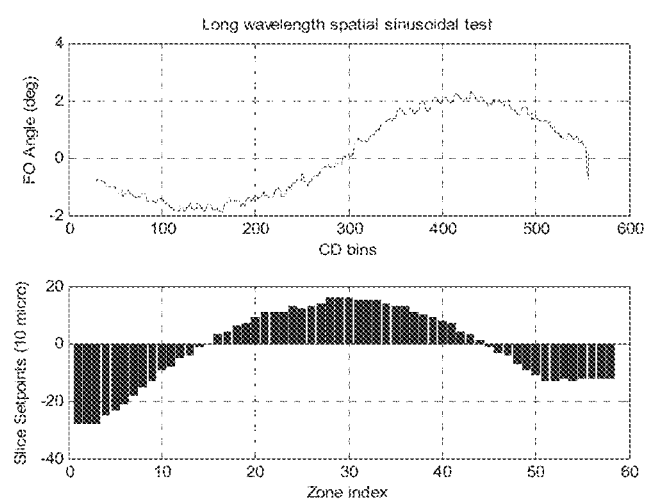

To overcome this limitation of traditional "bump" tests, one or more advanced spatial tests can also be performed on the slice lip actuators 250. FIGS. 4 and 5 illustrate example test results of short and long wavelength spatial sinusoidal bump tests (using locally present sinusoidal excitations). The bumps in FIG. 4 have two spatial frequency components, 1000 mm and 1300 mm. The bump in FIG. 5 has a wavelength roughly equal to the whole slice beam width, 5800 mm. From the tests, the static process gains at these three frequency components can be estimated by calculating a ratio of the peak-to-peak values of fiber orientation angle responses to the peak-to-peak values of slice lip actuator excitations. In this example, the gains for 1000 mm, 1300 mm, and 5800 mm are roughly equal to 0.2567 (deg/0.01 mm), 0.213 (deg/0.01 mm), and 0.0932 (deg/0.01 mm), respectively. The sinusoidal tests indicate that a CD-FO process from slice lip actuators 250 to fiber orientation angle measurements has low gains in the low spatial frequency domain. This spatial frequency characteristic is different from that normally seen with other CD measurements, such as dry weight, moisture, thickness, or gloss. To capture this uniqueness, a new spatial model structure is described below.

The spatial model G from slice to fiber orientation angle can be formulated by a two-component function:

$$G=G_1+G_2, \qquad (1)$$

where $G_1$ and $G_2$ are two-band diagonal matrices satisfying:

$$G_i=[g_i^1, g_i^2, \ldots, g_i^n], i=1 \text{ or } 2, \qquad (2)$$

where n is the zone number of a slice beam. The column $g_i^k$ denotes the sampled spatial response to the kth individual slice lip actuator 250 given by:

$$g_i^k = g_i(X \cdot d - c_i^k), X=1, 2, \ldots, m \qquad (3)$$

where X is the index of CD-FO measurement points, d is the interval between CD-FO measurement points, and m is the number of CD-FO measurement points. Here, $c_i^k$ is a CD-FO alignment model that specifies the spatial relationship between the center of a slice actuator and the center of its measured response in a web property, like fiber orientation angles. A standard CD alignment identification approach can be applied to a CD-FO process (such as is disclosed in U.S. Pat. No. 6,086,237, which is hereby incorporated by reference), and determining the response shape $g_i$ can be performed for CD-FO model identification.

In Equation (3), $g_i$ defines the spatial response shape of a CD-FO process. It can be formulated as a damped odd function, such as a damped sine function:

$$g_i = r_i e^{-a_i \left(\frac{x}{w_i}\right)^2} \sin\left(\frac{\pi x}{w_i}\right), i = 1 \text{ or } 2 \qquad (4)$$

or a scaled inverse proportional function with exponential decay:

$$g_i = \frac{r_i w_i}{\Phi x}\left(1 - e^{-\left(\frac{\Pi x}{w_i}\right)^2}\right), i = 1 \text{ or } 2 \qquad (5)$$

where $r_i$ is the process gain that defines the magnitude of a fiber orientation angle response and $w_i$ is the response width that indicates the region of fiber orientation flow propagation. Also, $\Phi$ and $\Pi$ are constant model normalization parameters, which can be used to make the model in Equation (5) more intuitive. For some systems, if $\Phi=10.2$ and $\Pi=16$, $r_i$ represents the absolute process gain value (such as the peak value of the fiber orientation impulse spatial response), and $w_i$ represents the absolute response width value (such as the location where the fiber orientation impulse spatial response drops to 20% of the peak value).

In Equation (1), $G_1$ and $G_2$ can use the same model structure (such as that defined in Equation (4) or (5)), or they can be different. Note that since the response shapes of $G_1$ and $G_2$ may be damped odd functions, they are not limited to the definitions in Equations (4) and (5). One benefit of using a two-component model structure is that the components $G_1$ and $G_2$ can independently specify the spatial characteristics at different spatial frequency bands, so the power spectrum shape of a CD-FO process is adjustable.

Similar to other CD processes, the dynamic model of a CD-FO process can be represented by a linear transfer function. For simplicity, a first order plus dead time (FOPDT) model may be used for many applications. In this case, a CD-FO response can be formulated as:

$$y=Gh(z)u, \qquad (6)$$

where $y \in \Re^m$ is a fiber orientation angle measurement, and $u \in \Re^n$ is the slice setpoint. Here, h(z) is the dynamic model, and G is the two-component response matrix in Equation (1).

Figure 6:
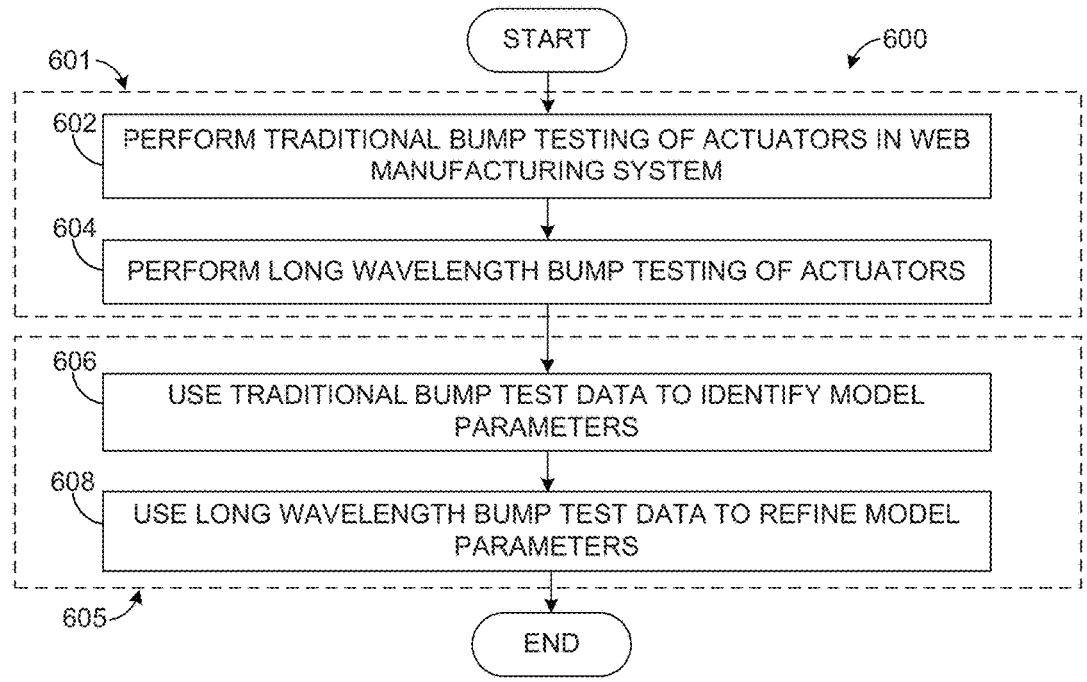

To optimize the parameters in Equations (4) and (5) (or other model), a two-stage system identification process 600 as shown in FIG. 6 can be used. The process 600 has four steps 602-608 divided into a testing stage 601 and a model identification stage 605. In stage 601 (testing), various types of tests can be performed to identify fiber orientation characteristics of a system.

Step 602: One or more traditional actuator bump tests (spatial impulse tests) are implemented, and experiment data is collected.

Step 604: One or more long wavelength actuator bump tests are implemented, and experiment data is collected. Long wavelength tests typically include making large setpoint adjustments to the slice lip with significant impact on the fiber orientation profiles, which has corresponding CD-FO responses larger than the noise level of the CD-FO process. Large setpoint adjustments are often available from a historic data pool in paper mills. Otherwise, it can be created by performing a spatial long wavelength (actuator beam width) actuator setpoint adjustment. Any suitable long wavelength actuator bump(s) can be used, such as a smile (\_/), a frown (/¯¯\), or a tilt (/) shape actuator setpoint profile. Both the traditional bump test data and the spatial long wavelength test data should be collected under the same wire speed and the same jet/wire ratio.

In stage 605 (model identification), the test data is used to derive a model of the fiber orientation characteristics of a system. As an example, the candidate function in Equation (4) for both components $G_1$ and $G_2$ can be chosen, and the overall spatial model for the process from slice to fiber orientation angle can be rewritten as:

$$g = g_1 + g_2 = re^{-a\left(\frac{x}{w}\right)^2}\sin\left(\frac{\pi x}{w}\right) + k_r r e^{-a\left(\frac{x}{k_w w}\right)^2}\sin\left(\frac{\pi x}{k_w w}\right), \qquad (7)$$

where r is the process gain, w is the response width, a is the attenuation, $k_r$ is the gain ratio, and $k_w$ is the width ratio. Here, assume the alignment model $c_k$ has been derived before identifying the CD-FO response shape.

During stage 605, a nonlinear optimization algorithm can be used to best fit the parametric model to the test results. The model could give the best tradeoff between fitness for the traditional bump test data and for the long wavelength bump test data.

Step 606: Use the traditional actuator bump test data to identify the parameters r, a, and w by solving a nonlinear least square optimization problem, such as:

$$[r^o, a^o, w^o] = \operatorname*{argmin}_{r,a,w} \|GU - y_s\|^2 (k_r = 0), \qquad (8)$$

where U is the spatial impulses of the slice, G is the spatial response matrix with the response shape defined in Equation (7), $y_s$ is the measured static fiber orientation angle response to the traditional actuator bump test, and $\|\bullet\|$ is a 2-norm operator. Here, it is assumed $k_r=0$, and $[r^o, a^o, w^o]$ is the optimal solution of the problem in Equation (8).

Step 608: Use the spatial long wavelength test data to fine tune the spatial model by solving another nonlinear least square problem, such as:

$$[k_r^o, k_w^o] = \underset{k_r, k_w}{\operatorname{argmin}} \|GU - y_1\|^2, \quad (9)$$

subject to $k_w > 1$ where $y_1$ is the measured static fiber orientation angle response to the spatial long wavelength test. The optimization solution of the problem in Equation (8), $[r^o, a^o, w^o]$, is employed as the known parameters in Equation (7). After solving the problem in Equation (9), the optimal model parameters $[r^o, a^o, w^o, k_r^o, k_w^o]$ can be identified. Here, the constrain $k_w > 1$ can guarantee that the second optimization problem in Equation (9) focuses on the low spatial frequency (spatial long wavelength) characteristics of the CD-FO process.

Figure 7:
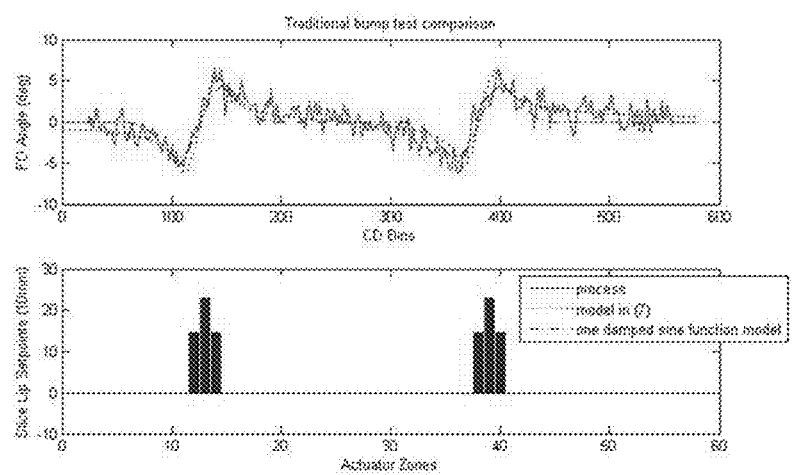
Figure 8:
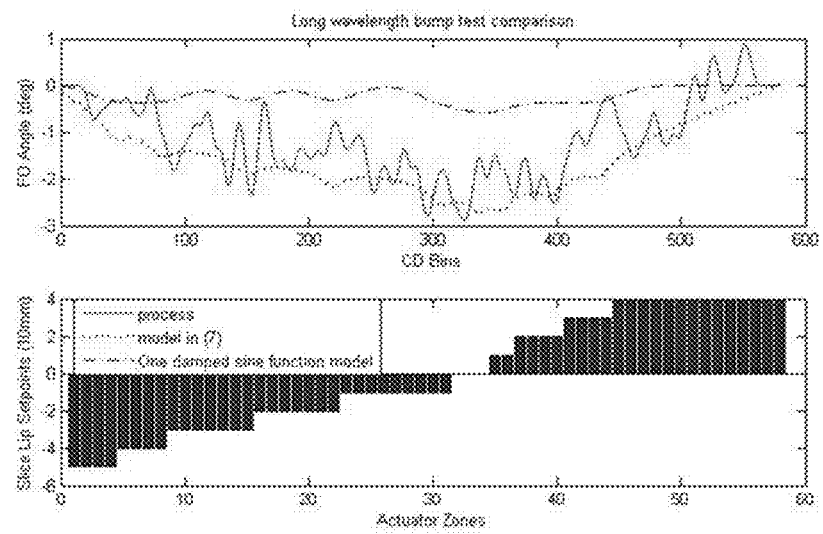

FIGS. 7 and 8 illustrate example model identification results. It can be seen that the identified model using the model structure in Equation (7) provides very accurate fiber orientation angle predictions for both the traditional bump test and the spatial long wavelength test. By using the two-stage model identification approach, the resulting CD-FO model can capture the characteristics of the CD-FO process in both low and high spatial frequency domains.

The model identification operations described above can be used to generate a parametric model for CD-FO control that has parameters for process gain and response width to indicate the magnitude of responses and the propagation of fiber flows after adjusting slice lip actuators. The model structure captures low gain in low spatial frequency domains as well as the characteristics of CD-FO processes in high frequency domains. The model identification operations could be performed using any suitable device(s). For example, the model identification could occur using the operator station 236 in FIG. 2A. Note, however, that the model identification could occur at any other suitable location(s), including outside of the web production system 200.

CD-FO Controller Design

Based on the spatial model developed above, a controller can be designed to regulate fiber orientation angle profiles, as well as to reduce or minimize twist in multi-layer paper webs. A modeling and control process 900 is summarized in FIG. 9.

Figure 9:
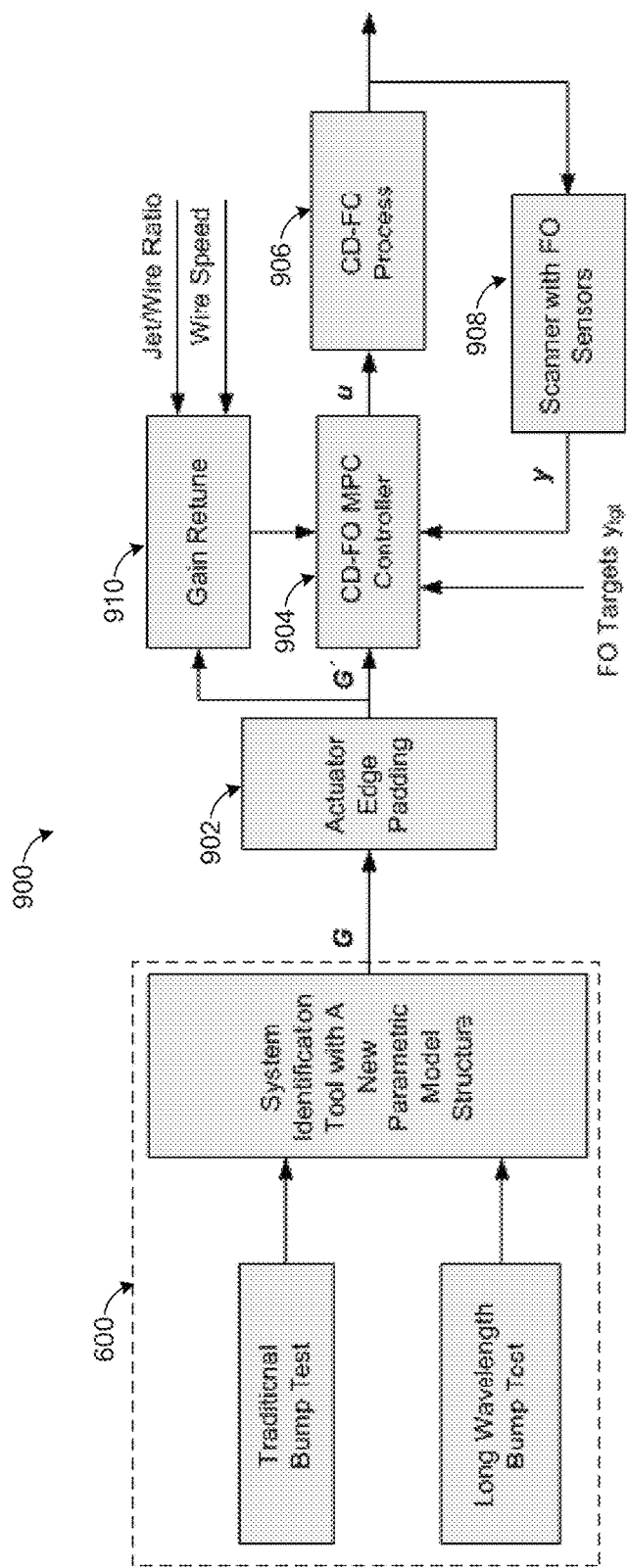

As shown in FIG. 9, a process model G can be identified by carrying out the two-stage model identification process 600 described above. The identified model G undergoes actuator edge padding 902, and the resulting matrix G' feeds into an MPC controller 904. The controller 904 generates control signals u to control a CD-FO process 906. Actual fiber orientations are measured using one or more FO sensors 908, and the measurements y are provided to the controller 904. To capture the nonlinearity of the CD-FO process, the controller model G' is retuned dynamically based on wire speeds and jet/wire ratios using a gain retuner 910.

From FIG. 9, it can be seen that the actuator edge padding and gain retune features can be systematically integrated with MPC controller design. The details of MPC controller design, actuator edge padding, and CD-FO spatial model retune are provided below.

Actuator Edge Padding

Figure 10:
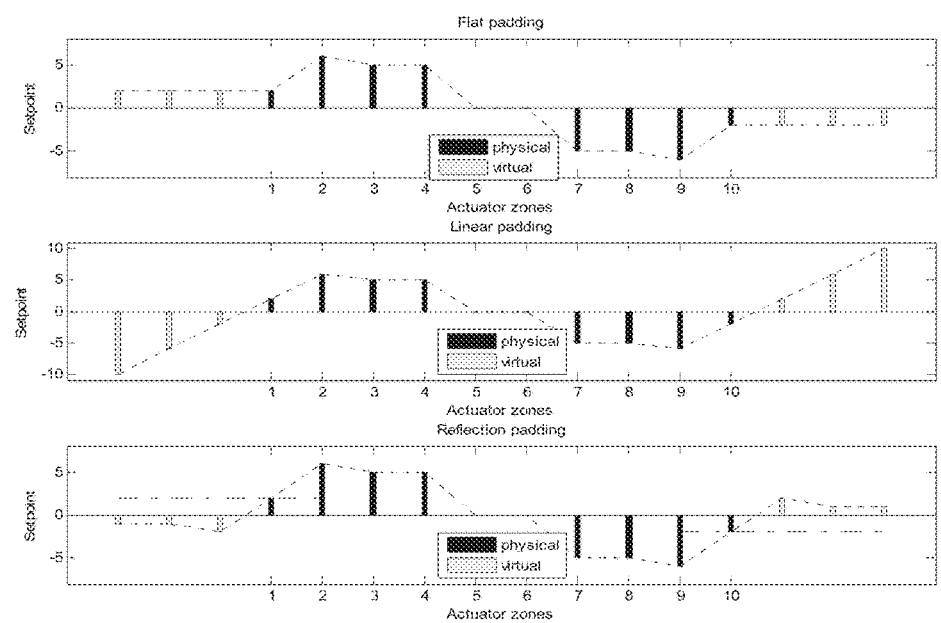

The actuator edge padding feature captures severe edge effects of the process from slice to fiber orientation angle, which prevents stock flow propagation freely toward the low and high edges of a web. It also enables the slice lip actuators 250 to control the average of fiber orientation angle profiles (for machine-directional control). The actuator edge padding can be achieved by padding a set of virtual zones at the beginning and the end of an actuator beam. The number of padded virtual zones can be determined by the response width of the CD-FO spatial model and CD-FO alignment. The setpoints of virtual zones can be determined by the actuator padding mode. Various actuator edge padding modes can be supported, such as flat, linear, and reflection. FIG. 10 illustrates these different modes of actuator edge padding. In FIG. 10, the solid bars represent the physical actuator zones, and the hollow bars represent the padded virtual zones.

Since the spatial response matrix $G \in \Re^{m \times n}$ can be represented by Equation (1), a set of virtual zones can be padded on the low and high edges of a slice lip actuator beam based on the process response width and alignment. Therefore, the response matrix G can be rewritten as:

$$G_{aug} = [G_{pad}^l, G, G_{pad}^h] \quad (10)$$

where $G_{aug} \in \Re^{m \times (n^l + n + n^h)}$ is an augmented spatial response matrix, $n_l$ is the number of padded virtual zones in the low edge, and $n_h$ is the number of padded virtual zones in the high edge. Here, $G_{pad}^l \in \Re^{m \times n^l}$ is the padding response matrix in the low edge, and $G_{pad}^h \in \Re^{m \times n^h}$ is the padding matrix in the high edge. After performing alignment interpolation in both the low and high edges, $G_{pad}^l$ and $G_{pad}^h$ can be derived by using the spatial response model in either Equation (4) or (5). The fiber orientation measurement output in Equation (6) can be rewritten as:

$$y = G_{aug} h(z) \begin{bmatrix} u_{pad}^l \\ u \\ u_{pad}^h \end{bmatrix}, \quad (11)$$

where $u_{pad}^l \in \Re^{n^l}$ are the virtual zone setpoints in the low edge, and $u_{pad}^h \in \Re^{n^h}$ are the virtual zone setpoints in the high edge.

One feature of actuator edge padding is that after enabling the edge padding, the fiber orientation angle average can be controlled by tilting the setpoints of the slice lip actuators 250. By setting different slopes of slice lip tilted setpoint profiles, the fiber orientation angle average can be adjusted in closed loop by the slice lip actuators 250.

Now the problem of actuator edge padding is converted into the calculation of the setpoints of virtual zones $u_{pad}^l$ and $u_{pad}^h$. The flat, linear, and reflection padding modes can be defined for the $u_{pad}^l$ and $u_{pad}^h$ calculations. Based on the actuator edge padding mode being used, a multiplier $\Gamma$ can be defined for the augmented spatial response matrix $G_{aug}$, satisfying:

$$y = G_{aug}h(z)\begin{bmatrix} u_{pad}^l \\ u \\ u_{pad}^h \end{bmatrix} = G_{aug}\Gamma h(z)u = G'h(z)u, \quad (12)$$

where $\Gamma \in \Re^{(n+n^l+n^h) \times n}$ is the multiplier of the spatial response matrix to integrate the setpoints of virtual zones into the setpoints of physical zones. From Equation (12), the spatial response matrix $G' \in \Re^{m \times n}$ for a CD-FO controller can be derived.

Design of the MPC Controller

In some embodiments, a CD-FO MPC controller 904 can be formulated as an online quadratic program, such as:

$$\min_{\Delta U(k)} \sum_{i=1}^{H_p} \left( \|Y(k+i) - Y_{sp}\|_{Q_1}^2 + \|\Delta U(k)\|_{Q_2}^2 + \|U(k) - U_{tgt}\|_{Q_3}^2 + U(k)^T Q_4 U(k) \right) \quad (13)$$

subject to $$A\Delta U(k) \leq b - CU(k-1) \quad (14a)$$

$$Y(k) = \underline{G}\underline{h}(z)U(k) \quad (14b)$$

where $Y(k+i) \in \Re^{N_y \cdot m}$ is the augmented measurement profiles at instant (k+i) that contain the fiber orientation angle measurements of different layers, as well as the twist profile of a multi-layer papermaking process. Other measurements, such as dry weight, moisture, or thickness, can be optionally included in the definition of the augmented measurement profiles Y(k+i). Here, m is the number of measurement points of a scanning fiber orientation sensor, and $N_y$ is the number of the quality properties. Also, $$U(k) \in \Re^{\sum_{j=1}^{N_u} n_j}$$

is the augmented slice actuator setpoint profiles. Other CD actuator beams, such as headbox dilution, steambox, or water spray beams, can be optionally included in the definition of the augmented actuator setpoint profiles U(k). Further, $n_j$ is the actuator zone numbers of the jth actuator beam, and $N_u$ is the total number of actuator beams. The actuator hard constraints are defined by Equation (14a), where A, b, and C define the inequality linear constraints of the slice lip actuators 250, such as the maximum/minimum setpoints, the bending limits, and the target average setpoints. The constraint in Equation (14b) defines the process model of a CD-FO process. $\underline{G}$ and $\underline{h}(z)$ are the augmented spatial and dynamic models of a multivariable actuator array and multiple fiber orientation quality measurement process whose components G and h(z) of each loop are defined in Equation (6). $Q_1$, $Q_2$, $Q_3$ and $Q_4$ are tuning parameters of an MPC controller. The optimization variable $\Delta U(k)$ is the optimized actuator move in the scan k. After implementing $\Delta U(k)$, optimal fiber orientation control can be achieved in closed-loop. See U.S. Pat. No. 6,807,510 (hereby incorporated by reference) for additional details of optimizing a typical CD-MPC controller.

Process Gain Retune

Figure 11:
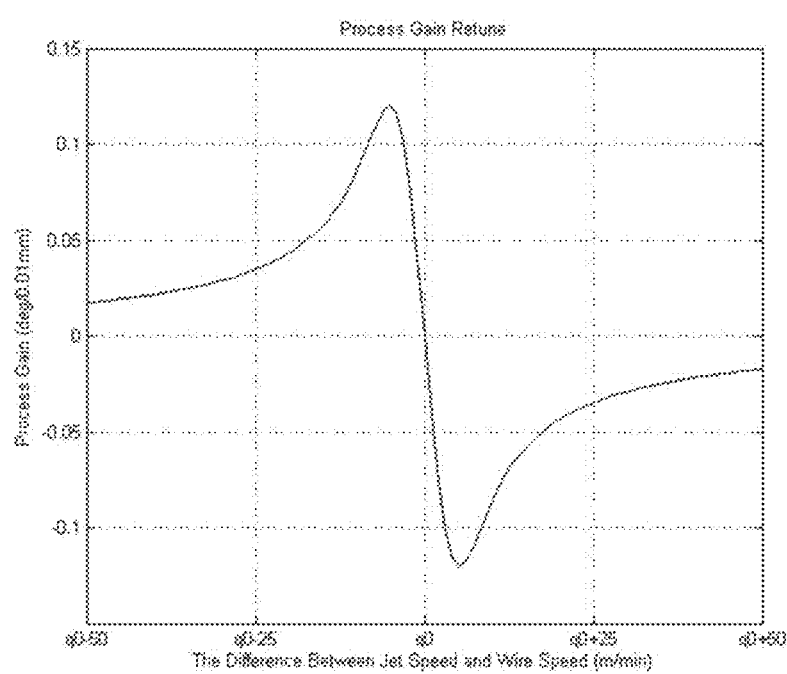

As discussed above, nonlinearity is one challenge to control of a CD-FO process. The process gains from slice to fiber orientation angle can be highly dependent on the wire speed and jet/wire ratio (rush or drag). In an extreme situation, the sign of gains can switch from positive to negative within a same grade with different jet/wire ratios and wire speeds. FIG. 11 illustrates an example effect of jet/wire ratio and wire speed on the process gains from slice to fiber orientation angle. The y-axis in FIG. 11 is the normalized process gain, and the x-axis in FIG. 11 is the speed difference between the wire and the jet (this can be back-calculated based on the jet/wire ratio and wire speed).

Gain retune can be used to capture the nonlinearity of a fiber orientation process and dynamically update the process gains in the closed-loop. The base function used for process gain retune can be defined by:

$$g = \frac{g_{lam}}{q - q_o}\left(1 - e^{-\frac{(q-q_o)^2}{k}}\right) \quad (15)$$

where $g_{lam}$ is the laminar gain of the headbox stock jet, k is the degree of the stock jet turbulence, q is the difference between the jet speed and the wire speed, and $q_o$ is the crossing-over point where the paper machine is operated without rush and drag. In practice, the value of q can be easily back-calculated based on the current wire speed and jet/wire ratio. Given a set of ($g_i$, $q_i$) pairs, the values of $g_{lam}$, q, and $C_o$ can be derived using a standard nonlinear curve-fitting algorithm. The ($g_i$, $q_i$) pairs are identified by performing a set of CD-FO model identifications (as described above) at different wire speeds and different jet/wire ratios. The results could be stored in a "gain table" or other data structure. Note that while model retuning is shown and described as being done using the jet/wire ratio and wire speed, other factors could also be used (such as slice opening). Also note that retuning can occur multiple times.

In this way, a model for controlling fiber orientation can be retuned for a particular paper machine 202. The model can then be deployed and used to control the paper machine 202 and, ideally, to obtain a desired fiber orientation in the sheet 208 being produced. By approaching or obtaining the desired fiber orientation, problems associated with poor fiber orientation can be reduced or eliminated.

Although FIGS. 3 through 11 illustrate example details of techniques for modeling and controlling cross-direction fiber orientation processes, various changes may be made to FIGS. 3 through 11. For example, while the above description has described particular details of specific ways to generate specific models (such as parametric spatial models) and specific ways to design a CD-FO MPC controller, these details are for illustration only. Other techniques could be used to generate models involving fiber orientation, and other techniques could be used to design MPC or other controllers for controlling fiber orientation. In a particular implementation of the above technique, a 2×3 multivariable MPC controller can be used with slice lip top and bottom actuators to control the fiber angle on the top side and the bottom side of a sheet and to control the twist proxy.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

The invention claimed is:

1. A method comprising:
 obtaining a controller model for a controller that is to control a fiber orientation (FO) process, the controller model associated with cross-directional fiber orientation of a web, the controller model generated using a process model based on spatial frequency characteristics of the FO process identified in a spatial long wavelength test of the FO process, wherein the spatial frequency characteristics of the FO process are further identified in a spatial impulse test of the FO process, and wherein the process model is based on:
  high spatial frequency characteristics of the FO process associated with results of the spatial impulse test; and
  low spatial frequency characteristics of the FO process associated with results of the spatial long wavelength test;
 controlling, by the controller, the FO process based on the controller model; and
 dynamically adjusting at least one model parameter of the controller model during operation of the controller.

2. The method of claim 1, wherein:
 the FO process is associated with (i) a wire screen or mesh and (ii) a headbox having an opening from which a jet of material exits the headbox onto the wire screen or mesh; and
 dynamically adjusting the at least one model parameter comprises:
  performing bump tests of the FO process at one or more of: (i) different speeds of the wire screen or mesh and (ii) different jet speed/wire speed ratios; and
  using a gain retune function expressed as:

$$g = \frac{g_{lam}}{q - q_o}\left(1 - e^{-\frac{(q-q_o)^2}{k}}\right)$$

where $g_{lam}$ represents a laminar gain of the jet, k represents a degree of jet turbulence, q represents a difference between the jet speed and the wire speed, and $q_o$ represents a crossing-over point where the FO process is operated without rush and drag.

3. The method of claim 2, wherein:
 performing the bump tests comprises performing a set of bump tests of the FO process with the different jet speed/wire speed ratios and generating a gain retune table;
 using the gain retune function comprises identifying the values of $q_o$ and k based on the gain retune table; and
 dynamically adjusting the at least one model parameter comprises retuning a process gain of the controller model using the gain retune function with the identified values of $q_o$ and k.

4. The method of claim 1, further comprising:
 generating the controller model using the process model.

5. The method of claim 4, wherein the process model is expressed as:

$$g = re^{-a\left(\frac{x}{w}\right)^2}\sin\left(\frac{\pi x}{w}\right) + k_r re^{-a\left(\frac{x}{k_w w}\right)^2}\sin\left(\frac{\pi x}{k_w w}\right)$$

where g represents the process model, r represents a process gain, w represents a response width, a represents an attenuation, $k_r$ represents a gain ratio, and $k_w$ represents a width ratio.

6. The method of claim 4, wherein the process model is expressed as:

$$G = G_1 + G_2;$$

where G represents the process model, $G_1$ and $G_2$ represent model components expressed as:

$$G_i = \frac{r_i w_i}{\Phi x}\left(1 - e^{-\left(\frac{\Pi x}{w_i}\right)^2}\right), i = 1 \text{ or } 2;$$

$r_i$ represents a response gain of the $i^{th}$ model component, $w_i$ represents a response width of the $i^{th}$ model component, and $\Phi$ and $\Pi$ represent model normalization coefficients.

7. A method comprising:
 applying actuator edge padding to a process model;
 generating a controller model for a controller that is to control a fiber orientation (FO) process, the controller model associated with cross-directional fiber orientation of a web, the controller model generated using the process model based on spatial frequency characteristics of the FO process identified in a spatial long wavelength test of the FO process;
 controlling, by the controller, the FO process based on the controller model; and
 dynamically adjusting at least one model parameter of the controller model during operation of the controller.

8. The method of claim 7, wherein:
 the FO process is associated with a headbox having multiple slice lip actuators, each slice lip actuator having an associated actuator zone; and applying the actuator edge padding comprises capturing edge effects of the slice lip actuators on fiber orientation angle profiles of the web.

9. An apparatus comprising:
a process controller configured to control a fiber orientation (FO) process, the process controller comprising:
at least one memory configured to store a controller model, the controller model associated with cross-directional fiber orientation of a web, the controller model generated using a process model based on spatial frequency characteristics of the FO process identified in a spatial long wavelength test of the FO process, wherein the spatial frequency characteristics of the FO process are further identified in a spatial impulse test of the FO process, and wherein the process model is based on:
high spatial frequency characteristics of the FO process associated with results of the spatial impulse test; and
low spatial frequency characteristics of the FO process associated with results of the spatial long wavelength test; and
at least one processing device configured to:
control the FO process based on the controller model; and
dynamically adjust at least one model parameter of the controller model during operation of the process controller.

10. The apparatus of claim 9, wherein:
the FO process is associated with (i) a wire screen or mesh and (ii) a headbox having an opening from which a jet of material exits the headbox onto the wire screen or mesh; and
the at least one processing device is configured to:
initiate performance of bump tests of the FO process at one or more of: (i) different speeds of the wire screen or mesh and (ii) different jet speed/wire speed ratios; and
use a gain retune function expressed as:

$$g = \frac{g_{lam}}{q - q_o}\left(1 - e^{-\frac{(q-q_o)^2}{k}}\right)$$

where $g_{lam}$ represents a laminar gain of the jet, k represents a degree of jet turbulence, q represents a difference between the jet speed and the wire speed, and $q_o$ represents a crossing-over point where the FO process is operated without rush and drag.

11. The apparatus of claim 10, wherein:
the at least one processing device is configured to initiate performance of a set of bump tests of the FO process with the different jet speed/wire speed ratios and generate a gain retune table;
the at least one processing device is configured to identify the values of $q_o$ and k based on the gain retune table; and
the at least one processing device is configured to retune a process gain of the controller model using the gain retune function with the identified values of $q_o$ and k.

12. The apparatus of claim 9, wherein the at least one processing device is configured to dynamically adjust the at least one model parameter of the controller model in order to capture nonlinearity of the FO process and dynamically update process gains.

13. The apparatus of claim 9, wherein the at least one processing device is configured to dynamically adjust the at least one model parameter of the controller model multiple times.

14. A non-transitory computer readable medium embodying a computer program, the computer program comprising computer readable program code for:
obtaining a controller model for a controller that is to control a fiber orientation (FO) process, the controller model associated with cross-directional fiber orientation of a web, the controller model generated using a process model based on spatial frequency characteristics of the FO process identified in a spatial long wavelength test of the FO process, wherein the spatial frequency characteristics of the FO process are further identified in a spatial impulse test of the FO process, and wherein the process model is based on:
high spatial frequency characteristics of the FO process associated with results of the spatial impulse test; and
low spatial frequency characteristics of the FO process associated with results of the spatial long wavelength test; and
dynamically adjusting at least one model parameter of the controller model during operation of the controller.

15. The non-transitory computer readable medium of claim 14, wherein:
the FO process is associated with (i) a wire screen or mesh and (ii) a headbox having an opening from which a jet of material exits the headbox onto the wire screen or mesh; and
the computer readable program code for dynamically adjusting the at least one model parameter of the controller model comprises computer readable program code for:
initiating bump tests of the FO process at one or more of: (i) different speeds of the wire screen or mesh and (ii) different jet speed/wire speed ratios; and
using a gain retune function expressed as:

$$g = \frac{g_{lam}}{q - q_o}\left(1 - e^{-\frac{(q-q_o)^2}{k}}\right)$$

where $g_{lam}$ represents a laminar gain of the jet, k represents a degree of jet turbulence, q represents a difference between the jet speed and the wire speed, and $q_o$ represents a crossing-over point where the FO process is operated without rush and drag.

16. The non-transitory computer readable medium of claim 15, wherein:
the computer readable program code for initiating the bump tests comprises computer readable program code for initiating a set of bump tests of the FO process with the different jet speed/wire speed ratios and generating a gain retune table; and
the computer readable program code for dynamically adjusting the at least one model parameter of the controller model comprises computer readable program code for:
identifying the values of $q_o$ and k based on the gain retune table; and
retuning a process gain of the controller model using the gain retune function with the identified values of $q_o$ and k.

17. The non-transitory computer readable medium of claim 14, wherein the computer readable program code for dynamically adjusting the at least one model parameter of the controller model comprises computer readable program code for adjusting the at least one model parameter of the controller model in order to capture nonlinearity of the FO process and dynamically update process gains.

18. The non-transitory computer readable medium of claim 14, wherein the computer readable program code for dynamically adjusting the at least one model parameter of the controller model comprises computer readable program code for dynamically adjusting the at least one model parameter of the controller model multiple times.

19. An apparatus comprising:
a process controller configured to control a fiber orientation (FO) process and apply actuator edge padding to a process model; the process controller comprising:
at least one memory configured to store a controller model, the controller model associated with cross-directional fiber orientation of a web, the controller model generated using the process model based on spatial frequency characteristics of the FO process identified in a spatial long wavelength test of the FO process; and
at least one processing device configured to:
control the FO process based on the controller model; and
dynamically adjust at least one model parameter of the controller model during operation of the process controller.

20. A non-transitory computer readable medium embodying a computer program, the computer program comprising computer readable program code for:
applying actuator edge padding to a process model;
obtaining a controller model for a controller that is to control a fiber orientation (FO) process, the controller model associated with cross-directional fiber orientation of a web, the controller model generated using the process model based on spatial frequency characteristics of the FO process identified in a spatial long wavelength test of the FO process; and
dynamically adjusting at least one model parameter of the controller model during operation of the controller.

* * * * *